United States Patent
Bernardet et al.

[11] Patent Number: 6,159,028
[45] Date of Patent: Dec. 12, 2000

[54] FLAT PLATE DETECTOR AND CONNECTOR COMPRISING SAID DETECTOR

[75] Inventors: Jean-Baptiste Bernardet, Pontarlier, France; Guy Duffet, deceased, late of Pontarlier, France, by Louis Olivier, legal representative

[73] Assignee: Framatome Connectors International, Paris la Defense, France

[21] Appl. No.: 08/904,116

[22] Filed: Jul. 31, 1997

[30] Foreign Application Priority Data

Aug. 1, 1996 [FR] France .................................. 96 09735

[51] Int. Cl.[7] .................................................. H01R 29/00
[52] U.S. Cl. ............................................. 439/188; 439/630
[58] Field of Search .............................. 439/64, 188, 260, 439/488, 489, 636; 200/51 R, 51.09

[56] References Cited

U.S. PATENT DOCUMENTS

| | | | |
|---|---|---|---|
| 5,259,777 | 11/1993 | Schuder et al. | 439/188 |
| 5,511,986 | 4/1996 | Casey et al. | 439/188 |
| 5,775,937 | 7/1998 | Bricaud et al. | 439/489 |

FOREIGN PATENT DOCUMENTS

| | | |
|---|---|---|
| 0316699 | 5/1989 | European Pat. Off. . |
| 0542231 | 5/1993 | European Pat. Off. . |
| 0660253 | 6/1995 | European Pat. Off. . |
| 0669590 | 8/1995 | European Pat. Off. . |
| 2578072 | 8/1986 | France . |

*Primary Examiner*—Khiem Nguyen
*Attorney, Agent, or Firm*—Pollock Vande Sande & Amernick

[57] ABSTRACT

A detector of a flat plate (12) comprises two contact bars (1, 2) extending along two longitudinal parallel axes. Each contact bar is a curved bar having two segments extending opposite each other, a first bar (1) comprising an extension piece (3) configured so as to be opposite the second bar (2), these bars being lodged in a housing (13) suitable for holding the segments compressed between walls of the housing. The extension piece (3) forms a projection on one face of the housing, so that the flat plate (12) traveling parallel to this face can move the extension piece (3) between the projecting position thereof and a drawn-in position in which the extension piece (3) is in contact with a second bar (2). Use, in particular, for a frame (10) for reading an electronic card (12).

9 Claims, 2 Drawing Sheets

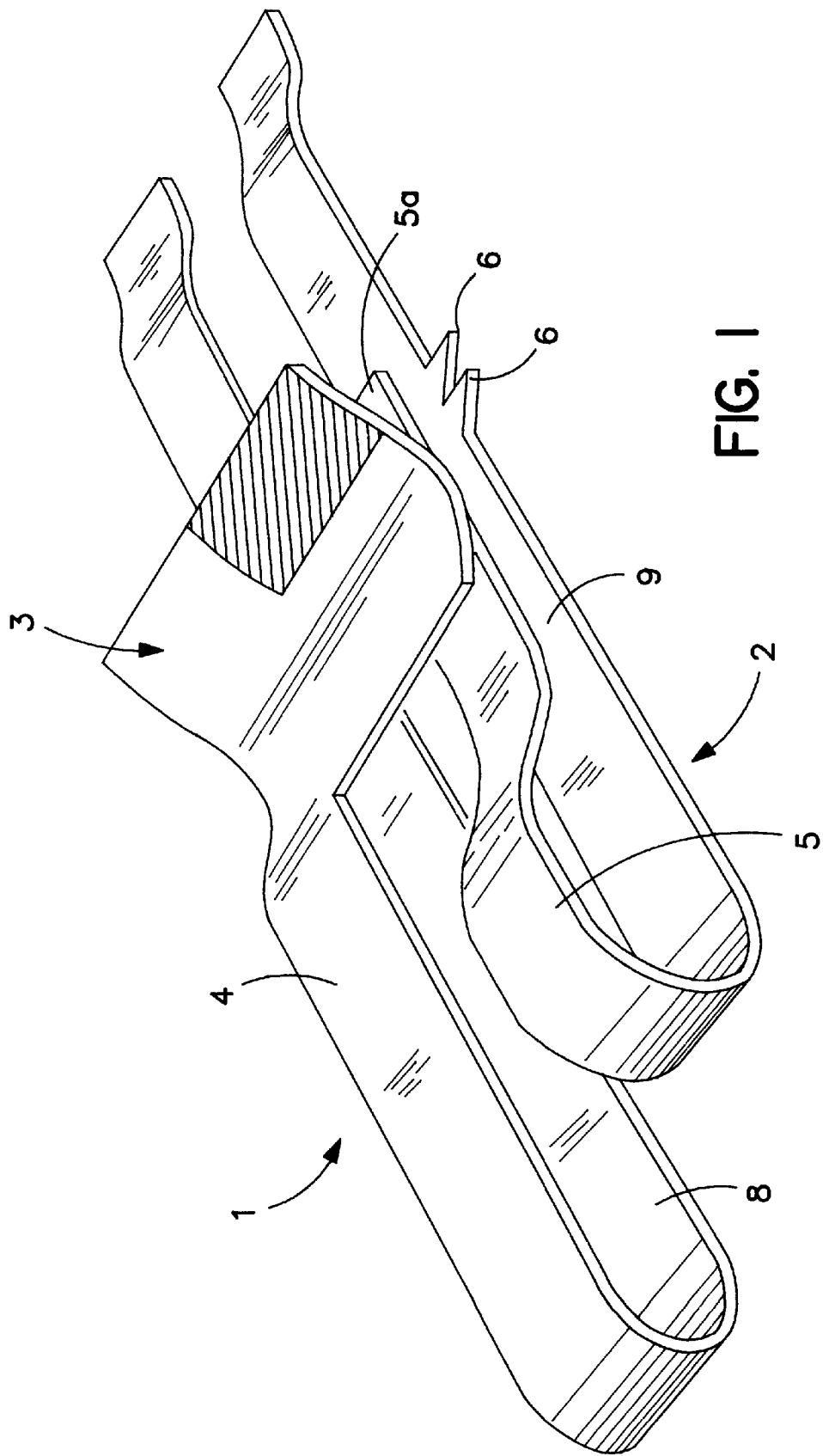
FIG. I

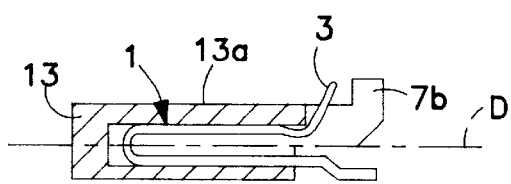
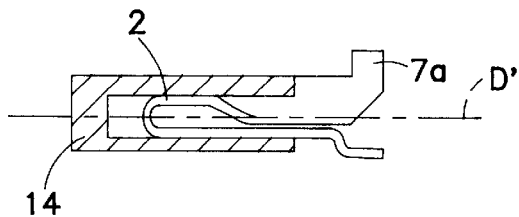
FIG. 2A  FIG. 2B
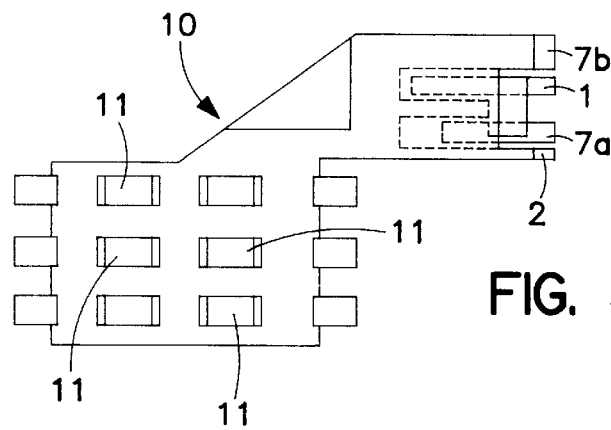
FIG. 3
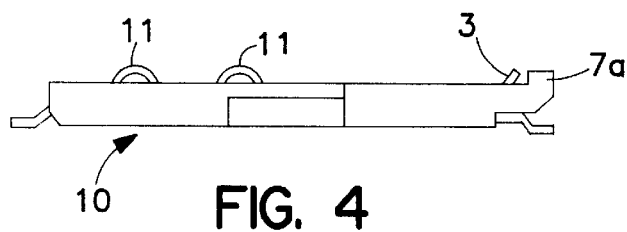
FIG. 4
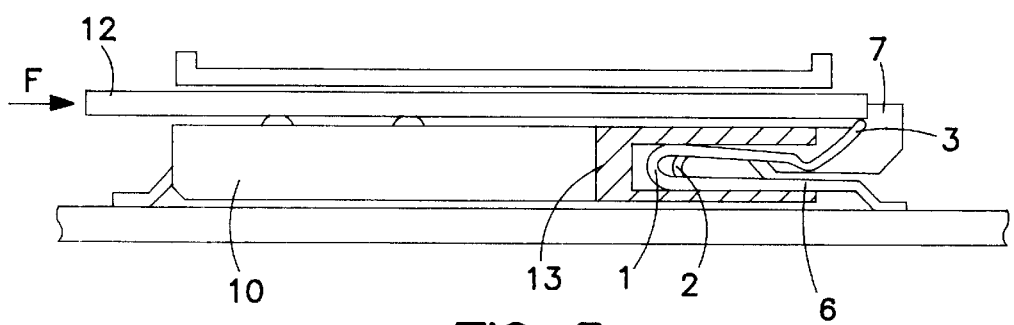
FIG. 5

FLAT PLATE DETECTOR AND CONNECTOR COMPRISING SAID DETECTOR

FIELD OF THE INVENTION

The invention concerns a detector of the presence or end of travel of a flat plate, as well as a connector, for a example a frame for reading a magnetic board, equipped with such a detector.

BACKGROUND OF THE INVENTION

Conventional practice includes equipping flat plate connectors with a detector of the presence or end of travel of the flat plate. This kind of detector proves necessary in order to position with precision the contact regions of the flat plate, such as a magnetic board, in connection with the contacts associated with the connector.

Applicant FR 2 714 534 discloses, for example, a connector comprising a pair of end-of-travel contacts on a single tape roll.

In this embodiment, the flat plate is configured so as to move one of detector bars toward the other as the plate travels forward on the connector, the end of travel of the flat plate occurring when the bars make mechanical and electrical contact.

When the flat plate is withdrawn, the bars are returned elastically to their initial positions, in which they are separated from each other. However, the distance separating the two bars cannot be maintained with great precision, in particular when the elastic return force changes after many uses. This automatically produces uncertainty as regards the distance over which the flat plate must travel in order to bring about the contact of the two bars. The positioning of the flat plate in relation to the contactors of the connector thus remains imperfect.

SUMMARY OF THE INVENTION

The invention is intended to solve the problem mentioned above and to propose a detector of a flat plate allowing its precise positioning in a connector.

The detector of a flat plate, such as an electronic card, in accordance with the invention comprises two contact bars extending along two parallel longitudinal axes.

In accordance with the invention, each contact bar is a curved bar incorporating two segments extending opposite to each other, a first bar comprising an extension piece to be extended opposite the second bar, thed bars being held in a housing designed so as to hold the segments compressed between the housing walls, the flat plate to be moved parallel to one face of the housing and the extension piece forming a projection on that face, such that the flat plate can move the extension piece between the projecting position and a drawn-in position in which the extension piece is in contact with this second bar.

Accordingly, by virtue of the curved shape of the bars, which are prestressed between the walls of a housing, precise spacing between the contact bars can be obtained.

According to one embodiment of the invention, each bar comprises a first segment extending in a plane, and a second segment elastically returned at a distance from this first segment, this distance being greater than the distance separating the walls of the housing which keeps the segments compressed.

When the bars are positioned in the housing, they are automatically compressed and pre-stressed.

According to a preferred embodiment of the invention, at least one stop-motion device projects outward from the face of the housing directly below the extension piece belonging to the first bar.

In this way, the detector according to the invention makes it possible to mark exactly the end of travel of the flat plate.

According to another inventive feature, a connector of a flat plate, such as electronic cards, comprises contactors which lie in a single plane and are configured so as to be in contact with the flat plate inserted in a direction F.

According to the invention, this connector comprises a detector such as that described above, which is positioned below the contactors with respect to the aforementioned direction F.

BRIEF DESCRIPTION OF THE DRAWINGS

Other advantages and features of the invention will emerge in the following description.

In the attached drawings provided by way of examples,

FIG. 1 is a perspective view of the curved bars of the detector conforming to the invention;

FIGS. 2A and 2b are cross-sections of the housing holding the curved bars in FIG. 1;

FIG. 3 is a top view of a connector according to the invention;

FIG. 4 is a side view of the connector in FIG. 3; and

FIG. 5 is a side view in partial cross-section illustrating the positioning of the flat plate on a connector according to the invention.

DESCRIPTION OF THE PREFERRED EMBODIMENT

As illustrated in FIG. 1, a detector of a flat plate, such an electronic card, comprises two contact bars 1, 2 which extend respectively along two axes D, D', which are longitudinal or parallel to each other, as shown in FIGS. 2A and 2B.

Each contact bar 1, 2 is a curved bar having two segments 4, 5, 8, 9 extending opposite to each other. Each bar 1, 2 comprises a first segment 8, 9 extending in a single plane and a second segment 4, 5 positioned above this first segment and at a certain distance.

In this embodiment, the first bar 1 comprises two segments 8, 4 substantially parallel to one another, the second segment 4 ending in an extension piece 3 oriented so as to be opposite the second bar 2.

This extension piece consists of an inwardly-curved bracket, the convex face of this bracket facing the second bar 2.

The second bar 2 comprises a second inwardly-curved segment 5 having a portion adjacent to the first segment 9 and positioned at a distance from the first segment 9 which is greater than the distance separating the end 5a of the second segment 5 form the first segment 9.

As illustrated in FIGS. 2A and 2B, these bars 1, 2 are lodged in a housing 13, 14 which holds the segments 4, 5, 8, 9 compressed between its walls of.

In FIG. 2A, the bar 1 has two segments 4, 8 in contact with the inner walls of the housing 13.

In FIG. 2B, both the first segment 9 and the portion of the second segment 5 adjacent to the first segment 9 of the bar 2 are in contact with the inner walls of the housing 12. In this way, the end 5a of the second segment is arranged in proximity to the first segment 9.

Preferably, each bar 1, 2 is lodged in a separate housing 13, 14. When the bars 1, 2 are positioned in the housing 13, 14, the first segments 8 and 9 are placed in the same plane, the end 5a of the second segment 5 of the second bar 2 being positioned beneath the extension piece 3 projecting outward from the first bar 1.

This extension piece 3 belonging to the first bar forms a projection on one face 13a of the housing 13, so that, when a flat plate is arranged for movement parallel to face 13a of the housing 13, the flat plate moves the extension piece 3 between its projecting position and a retracted position in which the extension piece 3 is in contact with the second bar 2. This mechanism is clearly illustrated in FIG. 5, in which the flat plate 12 moves the extension piece 3 downward, so that the convex face of the extension piece enters into contact with the end 5a of the second bar.

The distance which thus separates the end 5a of the second bar from the convex face of the extension piece 3 when the bars 1, 2 are compressed in the housing 13, 14 is substantially equal to the height of the part of the extension piece 3 which projects above the face 13a of the housing.

As shown in FIG. 1, each first segment 8, 9, preferably incorporates teeth 6 in the plane of these first segments 8, 9 and is configured so as to engage with the walls of the housing 13, 14. Preferably, these teeth 6 are provided so as to form an attachment of these bars 1, 2 inside the housing 13, 14, as does a fork. The teeth 6 are thus shaped like triangles, whose vertices point toward the end of the segments 9, 8, so that the teeth 6 retract slightly when the bars 1, 2 are inserted in the housing 13, 14 and resist the withdrawal of these bars once they are put in place.

At least one stop-motion device is provided as a projection on the face 13a of the housing 13, 14 directly below the extension piece 3 belonging to the first bar. In this example, two stop-motion devices 7a, 7b are arranged on each side of the extension piece 3. Thus, when the flat plate is inserted on the face 13a of the housing 13, 14, the extension piece 3 moves aside to a position between the stop-motion devices 7a and 7b on which the flat plate 12 rests.

As illustrated in FIGS. 3 and 5, the detector is fitted on a connector for a flat plate, such as an electronic card. This connector may, for example, be a reading frame comprising brush-type contacts 11 arranged in a single plane and intended to come into contact with the flat plate 12 on contact regions provided for this purpose.

As shown in FIG. 5, the detector is positioned below the contactors as seen according to the direction F in which the flat plate 12 is inserted on the connector 10.

The contact bars 1, 2 could be lodged in a single housing.

What is claimed is:

1. A detector of a flat plate, such as an electronic card, comprising first and second contact bars extending respectively along two parallel longitudinal axes, each contact bar being a hairpin-shaped bar comprising two segments extending opposite each other, said first bar incorporating an extension piece configured so as to extend over said second bar, said bars being lodged in at least one housing adapted to hold said segments compressed between walls of said housing, said flat plate being movable parallel to a face of said housing, and said extension piece forming a projection on a face, whereby said flat plate can move said extension piece between said projecting position and a retracted position in which said extension piece is in contact with said second bar.

2. The detector according to claim 1, wherein each bar comprises a first segment extending in one plane and a second segment which is returned elastically at a distance from said first segment greater than the distance separating said walls of said at least one housing which hold said segments compressed.

3. The detector according to claim 1, wherein the extension piece comprises an inwardly-curved bracket, a convex face of said bracket being positioned opposite said second bar.

4. The detector according to claim 1, wherein said second bar comprises a second inwardly-curved segment having a portion adjacent to said first segment and arranged at a distance from said first segment greater than a distance separating an end of said second segment and said first segment.

5. The detector according to claim 1, wherein each bar is lodged in a separate housing.

6. The detector according to claim 2, wherein said first segment of each said bar incorporates teeth in the plane of said first segment, said teeth being adapted to engage walls of said at least one housing.

7. The detector according to claim 1, including at least one stop-motion device projecting outwardly from said face of said at least one housing directly below said extension piece of said first bar.

8. The detector according to claim 7, wherein stop-motion devices are arranged on each side of said extension piece.

9. A connector for a flat plate, such as an electronic card, comprising contactors positioned in one plane and adapted to come into contact with said flat plate upon its insertion in an insertion direction, wherein said connector comprises a detector in accordance with claim 1 which is positioned below said contactors with respect to said insertion direction F.

* * * * *